US009367804B1

(12) United States Patent
Moon et al.

(10) Patent No.: US 9,367,804 B1
(45) Date of Patent: Jun. 14, 2016

(54) SYSTEM FOR INSTABILITY DETECTION AND STRUCTURE ESTIMATION OF COMPLEX NETWORK DYNAMICS

(71) Applicant: HRL Laboratories, LLC, Malibu, CA (US)

(72) Inventors: Hankyu Moon, Oak Park, CA (US); Tsai-Ching Lu, Wynnewood, PA (US)

(73) Assignee: HRL Laboratories, LLC, Malibu, CA (US)

( * ) Notice: Subject to any disclaimer, the term of this patent is extended or adjusted under 35 U.S.C. 154(b) by 282 days.

(21) Appl. No.: 14/207,269

(22) Filed: Mar. 12, 2014

Related U.S. Application Data

(60) Provisional application No. 61/779,059, filed on Mar. 13, 2013.

(51) Int. Cl.
*G06N 5/04* (2006.01)
*G06N 5/02* (2006.01)
*G06N 5/00* (2006.01)

(52) U.S. Cl.
CPC .. *G06N 5/02* (2013.01); *G06N 5/00* (2013.01); *G06N 5/04* (2013.01)

(58) Field of Classification Search
None
See application file for complete search history.

(56) References Cited

PUBLICATIONS

Shi, Robust Signaling, Scheduling and Authentication in the Multi-User Multiple-Input-Multiple-Output Channel, Doctoral thesis, Brigham Young University, 2011, pp. 1-120.*

J.M. Thiery, J.M.D'Herbes, and C. Valentin, A model simulating the genesis of banded vegetation patterns in Niger, Journal of Ecology, 83, 1995.
M Rietkert, S.C. Dekker, P.C. Ruiter, and J. van de Koppel, Self-organized patchiness and catastrophic shifts in ecosystems, Science, 2004.
S. Ke'fi, M. Rietkerk, C.L. Alados:, Y Pueyo, V.P. Papanastasis, A. ElAich, and P.C. de Ruiter, Spatial vegetation patterns and imminent desertification in Mediterranean arid ecosystems, Nature, 449, 2007.
M. Scheffer, J. Bascompte, W.A. Brock, V. Brovkin, S.R. Carpenter, V. Dakos, H. Held, E.H. van Nes, M. Rietkerk, and G. Sugihara, Early-warning signals for critical transitions, Nature, 461, 2009.
R. Biggs, S.R. Carpenter, and W.A Brock, Turning back from the brink: Detecting an impending regime shift in time to avert it, PNAS, 2009.
V. Dakos, E.H. van Nes, R. Donangelo, H. Fort, and M. Scheffer, Spatial correlation as leading indicator of catastrophic shifts. Theoretical Ecology, 3, 2010.
V. Guttal and C. Jayaprakash, Spatial variance and spatial skewness: leading indicators of regime shifts in spatial ecological systems. Theoretical Ecology, 2, 2009.
A. Fernandez and H. Fort, Catastrophic phase transitions and early warnings in a spatial ecological model. Journal of Statistical Mechanics: Theory and Experiment, 2009.

(Continued)

Primary Examiner — Wilbert L Starks
(74) Attorney, Agent, or Firm — Tope-McKay & Associates

(57) ABSTRACT

Described is a system for predicting system instability. The system can measure the degree of the network's instability due to critical transitions using the leading eigenvalue of the covariance matrix, where the instability measure is invariant to (1) the changes in network structure in terms of addition/removal of nodes and links, and (2) the feedback of the global system stability to the changes in stability. Based on that, the system is operable for providing an estimation of the network's changing connectivity when the network is near critical transitions.

20 Claims, 9 Drawing Sheets
(7 of 9 Drawing Sheet(s) Filed in Color)

(56) References Cited

PUBLICATIONS

M. Shiino, Dynamical behavior of stochastic systems of infinitely many coupled nonlinear oscillators exhibiting phase transitions of mean-field type: H theorem on asymptotic approach to equilibrium and critical slowing down of order-parameter fluctuations, Phys. Rev. A, 1987.

T. Nishikawa, A.E. Motter, Y. Lai, and F.C. Hoppensteadt, Heterogeneity in oscillator networks: are smaller worlds easier to synchronize? Physical Review Letters 91, 2003.

A. Arenas, A. Diaz-Guilera, and C.J. Perez-Vicente, Synchronization reveals topological scales in complex networks, Physical Review Letters; 96, 2006.

H. Nakao and A. S. Mikhailov, Turing patterns in network-organized activator-inhibitor systems, Nature Physics, 2010.

L.M. Pecora and T.L. Carroll, Master stability functions for synchronized coupled systems, Physical Review Letters, 1998.

L. Arnold, Stochastic differential equations: theory and applications: Wiley, pp. 128-135 (1974).

D. Harmon, M De Aguitar, D. Chinellato, D. Braha, R.R. Epstein, and Y. Bar-Yam, Predicting economic market crises using measures of collective panic, Arxiv.org, 2011.

Tobias Preis, Helen Susannah Moat, & H. Eugene Stanley, "Quantifying trading behavior in financial markets using Google Trends," Scientific Reports 3, Article No. 1684, doi:10.1038/srep01684, Published Apr. 25, 2013.

K.E. Case, R.J. Shiller, and A.N. Weiss, Mortgage default risk and real estate prices: The use of index-based futures and options in real estate, NBER Working Paper No. W5078, 1995.

H. Moon and T. Lu, Early warning signal of complex systems: Network spectrum and critical transitions. In Workshop on Information in Networks (WIN), 2010.

P.E. McSharry, L.A. Smith, L. Taressenko, J. Martinerie, M. Le Van Quyen, M. Baulac, and B. Renault, Prediction of epileptic seizures: Are nonlinear methods relevant?, Nature Medicine, 9, 2003.

K. Lehnertz and C.E. Elger, Can Epileptic Seizures be Predicted? Evidence from nonlinear time series analysis of brain electrical activity, Physical Review Letters, 80, 1998.

K. Schindler, H. Leung, C.E. Elger, and K. Lehnertz, Assessing seizure dynamics by analysing the correlation structure of multichannel intracranial EEG, Brain, 130, 2007.

P. Erdös, and A. Rényi, On random graphs, Publications Mathematicae 6, 1959.

D.J. Watts and S.H. Strogatz, Collective dynamics of 'small-world' networks, Nature 393, 1998.

A-L Barabási and R. Albert, Emergence of scaling in random networks, Science 286, 1999.

A. Shoebm, "Application of machine learning to epileptic seizure onset detection and treatment," PhD Thesis, Massachusetts Institute of Technology, (Sep. 2009).

A. Goldberger, L. Amaral, L. Glass, J.M. Hausdorff, P.C. Ivanov, R.G. Mark, J.E. Mietus, G.B. Moody, C-K Peng, and H.E. Stanley, "PhysioBank, PhysioToolkit, and PhysioNet: Components of a New Research Resource for Complex Physiologic Signals," Circulation 2000: 101; e215-e220.

Hankyu Moon & Tsai-Ching Lu, "Self-Organized Patterns Reveal both the Instability and the Structure of Complex Networks," Spectral EWS NetSci 2012 Poster.

\* cited by examiner

SYSTEM FOR INSTABILITY DETECTION AND STRUCTURE ESTIMATION OF COMPLEX NETWORK DYNAMICS

CROSS-REFERENCE TO RELATED APPLICATIONS

This is a non-provisional patent application of U.S. Provisional Application No. 61/779,059, filed on Mar. 13, 2013, entitled, "INSTABILITY DETECTION AND STRUCTURE ESTIMATION OF COMPLEX NETWORK DYNAMICS."

BACKGROUND OF THE INVENTION (1) Field of Invention

The present invention relates to an instability detection system and, more particularly, to a system, method, and computer program product for predicting system instability.

(2) Description of Related Art

The present invention is directed to the field of system stability and change based on coordinated behavior patterns. There are many examples of complex networks showing coordinated behavior. The ability to predict system instability based on such behavior can provide crucial insight and time to address the predicted instability. For example, ecosystems and human society go through sudden regime shifts; these kinds of systematic shifts pose challenges to maintaining the stability of the nature or human society. Sudden disappearance of natural species could cause further disruption in the ecosystem. As another example, unexpected opinion swings or market collapse poses hard challenges to governing authorities. As a physiological example, early detection of brain seizure can provide considerable benefit to the affected patents. Efforts to detect and respond to such events before the onset of transitions are especially beneficial, because the measures to deal with any undesirable changes can be more effective before the system's full evolution toward a highly nonlinear system (see, for example, the List of Incorporated Cited Literature References, Literature Reference No. 5).

It has been speculated that catastrophic changes in nature are often preceded by peculiar signs, such as regular-shaped patches of vegetation before desertification (see Literature Reference Nos. 1, 2, and 3). Other researchers investigated catastrophic population changes observed in ecosystems, and derived quantitative indicators—increased temporal correlation, skewness, and spatial correlations of the population dynamics (see Literature Reference Nos. 4, 6, and 7). Fernandez et al. studied large-scale dynamical systems going through a bifurcation revealing self-organized spatial patterns as early signs (see Literature Reference No. 8). These approaches consider only the homogeneous lattice as the model of interactions. It would be a natural next step to investigate the coordinated behavior of evolving complex networks—consisting of a large number of entities exchanging heterogeneous influences that can model a wide range of real world systems.

Despite its broad applicability, however, the model of a heterogeneously networked dynamical system going through a phase transition has not been treated properly. The formidable issue of the complexity of connectivity has been mainly handled by statistical approaches—degree distributions, random network models (see Literature Reference No. 22, 23, and 24). Order emergence due to spin dynamics (see Literature Reference No. 9) or synchronization dynamics (see Literature Reference Nos. 10 and 11) has been extensively studied without considering the evolving connectivity and phase transition at the same time.

The idea of analyzing the data from complex networks having heterogeneous connectivity to quantitatively forecasting critical transition and estimating the network connectivity is completely foreign to the listed prior arts. Thus, a continuing need exists for a system that is capable of systematically analyzing multi-dimensional time series data from complex network dynamics to make forecasts of instabilities and critical transitions and estimate the network's underlying connectivity.

SUMMARY OF INVENTION

Described is a system, method, and computer program product for instability detection and structure estimation of complex network dynamics. The system, for example, includes one or more processors and a memory. The memory is a non-transitory computer-readable medium having executable instructions encoded thereon, such that upon execution of the instructions, the one or more processors performs several operations, such as identifying nodes and features to be measured from the complex network; receiving data from each node over a time series, the data representing dynamics of the complex network; determining a first time window, the time window having a fixed window size; calculating a covariance matrix for a time series inside the first time window; calculating eigenvalues $\mu_1$ for the covariance matrix; moving the time window by one time point to form a second time window; calculating a second covariance matrix for a time series inside the second time window; calculating eigenvalues for the second covariance matrix; and determining stability of the complex network.

In another aspect, the system performs an operation of calculating underlying connectivity of complex network based on the first and second covariance matrices.

Additionally, in calculating underlying connectivity of complex network, the connectivity can be calculated using an amplified Laplacian Further, in determining a first time window having a fixed window size, the window size is determined so that the window size maximizes a difference between $\mu_1$ from stable periods and $\mu_1$ from unstable periods.

Additionally, determining stability of the complex network further comprises an operation of determining if the eigenvalues are above a predetermined threshold.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where.

DETAILED DESCRIPTION

Figure 1:
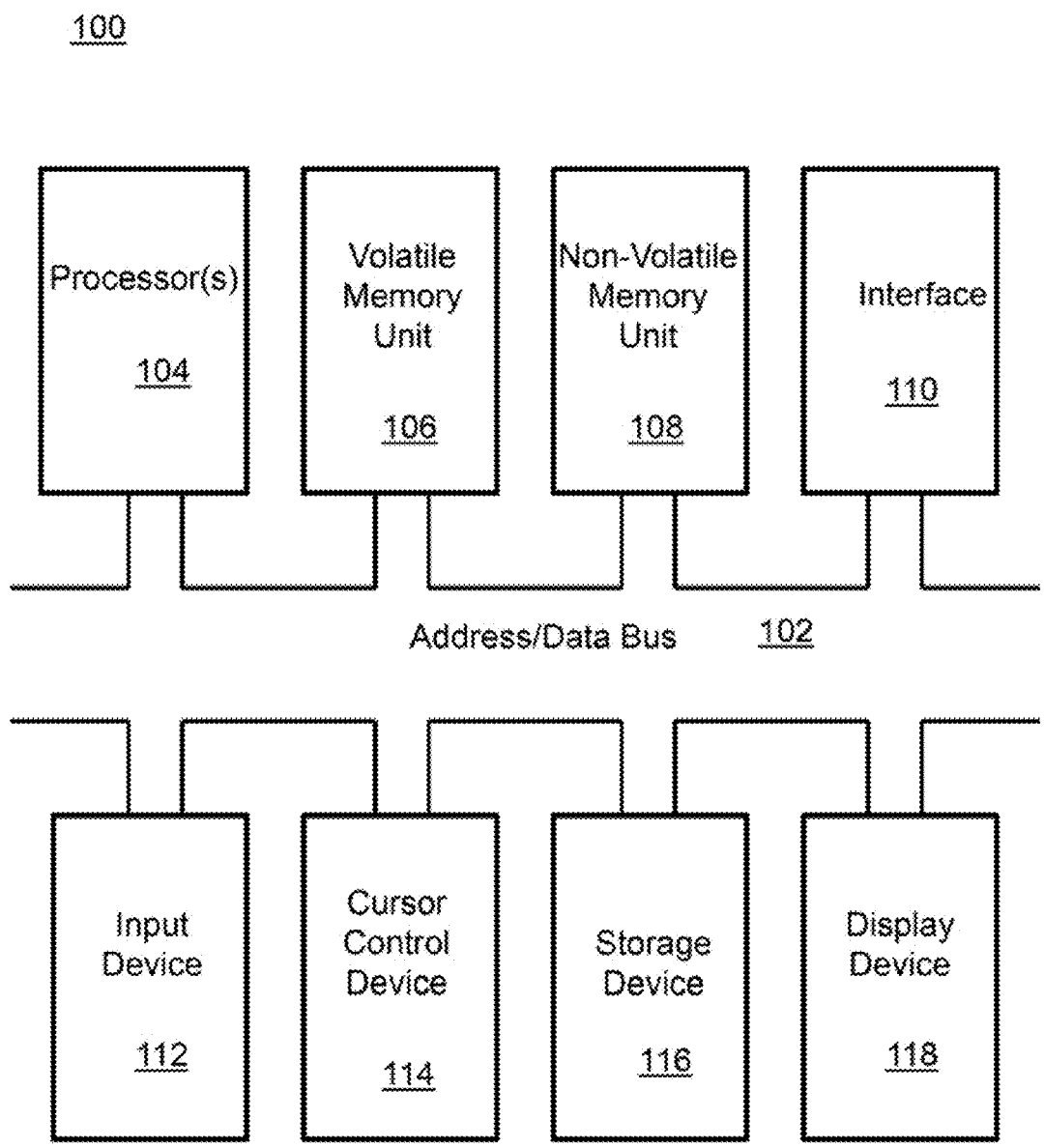
FIG. 1 is a block diagram depicting the components of a system according to the principles of the present invention.

The present invention relates to an instability detection system and, more particularly, to a system, method, and computer program product for predicting system instability. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited literature references is provided. Next, a description of various principal aspects of the present invention is provided. Subsequently, an introduction provides the reader with a general understanding of the present invention. Next, details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number.

1. J. M. Thiery, J. M. D'Herbes, and C. Valentin, A model simulating, the genesis of banded vegetation patterns in Niger, Journal of Ecology, 83, 1995.
2. M. Rietkert, S. C. Dekker, P. C. Ruiter, and J. van de Koppel, Self-organized patchiness and catastrophic shifts in ecosystems, Science, 2004.
3. S. Ke'fi, M. Rietkerk, C. L. Alados, Y Pueyo, V. P. Papanastasis, A. ElAich, and P. C. de Ruiter, Spatial vegetation patterns and imminent desertification in Mediterranean arid ecosystems, Nature, 449, 2007.
4. M. Scheffer, J. Bascompte, W. A. Brock, V. Brovkin, S. R. Carpenter, V. Dakos, H. Held, E. H. van Nes, M. Rietkerk, and G. Sugihara, Early-warning signals for critical transitions. Nature, 461, 2009.
5. R. Biggs, S. R. Carpenter, and W. A. Brock, Turning back from the brink: Detecting an impending regime shift in time to avert it, PNAS, 2009.
6. V. Dakos, E. H. van Nes, R. Donangelo, H. Fort, and M. Scheffer. Spatial correlation as leading indicator of catastrophic shifts. Theoretical Ecology, 3, 2010.
7. V. Guttal and C. Jayaprakash. Spatial variance and spatial skewness: leading indicators of regime shifts in spatial ecological systems. Theoretical Ecology, 2, 2009.
8. A. Fernandez and H. Fort. Catastrophic phase transitions and early warnings in a spatial ecological model. Journal of Statistical Mechanics: Theory and Experiment, 2009.
9. M. Shiino, Dynamical behavior of stochastic systems of infinitely many coupled nonlinear oscillators exhibiting phase transitions of mean-field type: H theorem on asymptotic approach to equilibrium and critical slowing down of order-parameter fluctuations, Phys. Rev. A, 1987.
10. T. Nishikawa, A. E. Motter, Y. Lai, and F. C. Hoppensteadt, Heterogeneity in oscillator networks: are smaller worlds easier to synchronize? Physical Review Letters 91, 2003.
11. A. Arenas, A. Diaz-Guiler, and C. J. Perez-Vicente, Synchronization reveals topological scales in complex networks, Physical Review Letters, 96, 2006.
12. H. Nakao and A. S. Mikhailov, Turing patterns in network-organized activator-inhibitor systems, Nature Physics, 2010.
13. L. M. Pecora and T. L. Carroll, Master stability functions for synchronized coupled systems, Physical Review Letters, 1998.
14. L. Arnold, Stochastic differential equations: theory and applications, Wiley, 1974.

15. D. Harmon, M De Aguitar, D. Chinellato, D. Braha, R. R. Epstein, and Y. Bar-Yam, Predicting economic market crises using measures of collective panic, Arxiv.org, 2011.
16. H. E. Stanley D. Helbing T. Preis, H. S. Moat. Quantifying trading behavior in financial markets using Google Trends. Under Review at Science, 2011.
17. K. E. Case, R. J. Shiller, and A. N. Weiss, Mortgage default risk and real estate prices: The use of index-based futures and options in real estate, NBER Working Paper No. W5078, 1995.
18. H. Moon and T. Lu, Early warning signal of complex systems: Network spectrum and critical transitions. In Workshop on Information in Networks (WIN), 2010.
19. P. E. McSharry, L. A. Smith, L. Tarassenko, J. Martinerie, M. Le Van Quyen, M. Baulac, and B. Renault, Prediction of epileptic seizures: Are nonlinear methods relevant?, Nature Medicine, 9, 2003.
20. K. Lehnertz and C. E. Elger, Can Epileptic Seizures be Predicted? Evidence from nonlinear time series analysis of brain electrical activity, Physical Review Letters, 80, 1998.
21. K. Schindler, H. Leung, C. E. Elger, and K. Lehnertz, Assessing seizure dynamics by analysing the correlation structure of multichannel intracranial EEG, Brain, 130, 2007.
22. P. Erdös, and A. Rènyi, On random graphs, Publicationes Mathematicae 6, 1959.
23. D. J. Watts and S. H. Strogatz, Collective dynamics of 'small-world' networks, Nature 393, 1998.
24. A-L Barabási and R. Albert, Emergence of scaling in random networks, Science 286, 1999.
25. A. Shoebm Application of machine learning to epileptic seizure onset detection and treatment, PhD Thesis, Massachusetts Institute of Technology, September 2009.
26. A. Goldberger, L. Amaral, L. Glass, J. M. Hausdorff, P. C. Ivanov, R. G. Mark, J. E. Mietus, G. B. Moody, C-K Peng, and H. E. Stanley. PhysioBank, PhysioToolkit, and PhysioNet: Components of a New Research Resource for Complex Physiologic Signals, Circulation 101, 2000.

(2) Principal Aspects

The present invention has three "principal" aspects. The first is a system for instability detection and structure estimation of complex network dynamics. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
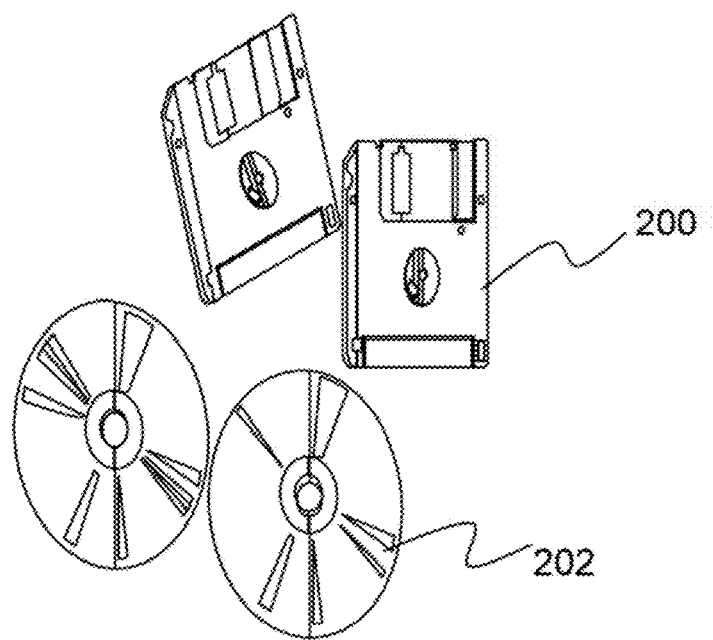
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" may be stored in the memory of a computer or on a computer-readable medium such as a floppy disk, a CD-ROM, and a flash drive. In either event, the instructions are encoded on a non-transitory computer-readable medium.

(3) Introduction

There are many examples of complex networks showing coordinated behavior. The formation and collapse of speculative asset bubble have been largely regarded as the consequence of herd behavior. It is assumed that in many cases the herd behavior emerges due to the broken balance between autonomous behavior and peer influence. It is also assumed that each network constituent revolves around its own stable state while exchanging influence with peers or environments, maintaining the balance between these two effects. When a population of such entities goes through a system-wide change that weakens the autonomous dynamics, the balance is broken and the effect of exchange propagates and dominates—resulting in large-scale phenomena. It would then be possible to decode the emergent pattern to identify both the ongoing change and the network of influence. A very simple model can capture the description and identify the relations among the dynamics, the large scale behaviors, and the connectivity.

Figure 3:
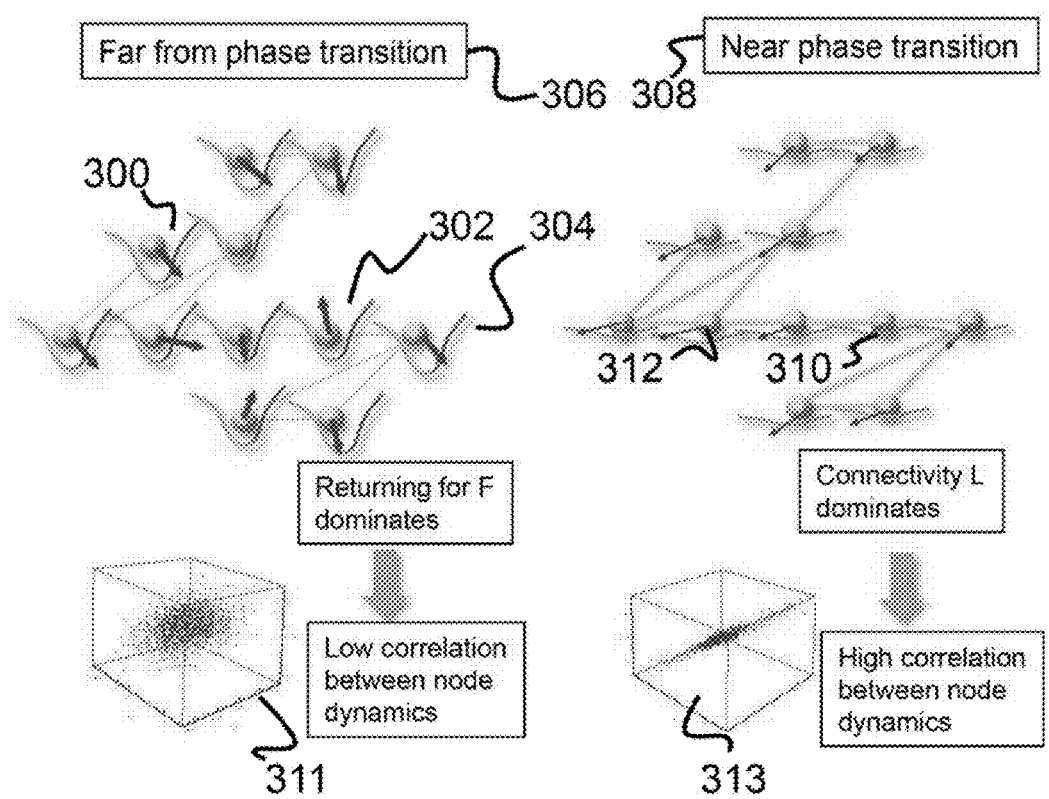
FIG. 3 is a flow chart illustrating coordinated behavior due to instability before a critical transition.

FIG. 3, for example, illustrates the emergence of coordinated behavior due to instability before a critical transition. When the phase transition breaks the balance between the autonomous dynamics and the peer influence, the effect of peer influence dominates and a self-organized population behavior emerges. Each node 300 in FIG. 3 represents an individual with each arrow 302 representing the individual's motion, while the curve 304 represent the stability landscape of the corresponding node. Each individual's motion 302 is represented by a returning force $F(X,C)$. Far from the transition 306, the dynamics $F(X,C)$ dominate over the relatively weaker interaction $LX$—exhibiting only individual motions 311. The aspects are discussed in further detail below.

Near the transition 308, however, the returning force $F'(X, C)$ 310 becomes much weaker than the persisting $LX$ 312—the shifting balance from the dynamics to structure causes the nodes to become highly coordinated 313, resulting in global patterns. Thus, it is desirable to be able to quantify and predict such dynamics.

As such, the system according to the principles of the present invention is directed to a methodology for the instability detection and structure estimation of complex networks. Described below is a technique to identify a fundamental mathematical relation between the network connectivity and the emergent behavior of complex network dynamics at instability due to critical transitions. This mathematical framework derives a method to analyze the emergent pattern to reveal both the network's instability and its evolving structure. The analysis provides a method for detecting a network's critical transition when its connectivity is constantly evolving but unknown.

In doing so, the system can measure the degree of the network's instability due to critical transitions using the leading eigenvalue of the covariance matrix, where the instability measure is invariant to (1) the changes in network structure in terms of addition/removal of nodes and links, and (2) the feedback of the global system stability to the changes in stability. Based on that, the system is operable for providing an estimation of the network's changing connectivity when the network is near critical transitions.

The present invention can be applied to many artificial system domains, non-limiting examples of which included complex electronic circuits, an electrical power grid, and ground or airborne vehicle systems. It can also be applied to social/economic stability analysis or the prediction of public unrest, social trends, as well as the nonlinear transition of living organisms, such as brain seizures.

(4) Specific Aspects of the Invention (4.1) Network Behavior Due to Instability

Natural or social systems can be modeled as consisting of a large number of entities $(x_1(t), x_2(t), \ldots, x_N(t))=X(t)$, exchanging material or informational influences through networked interactions. Each network node—an animal/plant or a person—constantly goes through changes in its state, such as metabolism, movement, or simply a 'daily cycle'. It is natural to decompose the state changes $x_i$ of the i-th node into two different components—one due to local autonomous dynamics $f_i(x_i)(F(X)=(f_1(x_1), f_2(x_2), \ldots f_N(x_N))$, for the whole network) and another due to a peer influence $\Sigma L_{ij}x_j$, where $L=\{L_{ij}\}$ is the combinatorial n×n Laplacian matrix of the adjacency relations (degrees of interactions)

A:L=DegreeMatrix(A)−A. Each $f_i(x_i)$ is a gradient to an equilibrium $x_i^{eq}$—a fixed point describing a stable behavior of $x_i$. The notion of equilibrium may conceptually encompass a limit cycle as well. For instance, $x_i^{eq}$ may represent a stable metabolic cycle or a person's well-established opinion about a certain topic. On the other hand, x is independently perturbed by a random Brownian motion σdW, which represents a fluctuation that constantly kicks each $x_i$ slightly away from the $x_i^{eq}$. An external phase parameter C augments the $f_i(\bullet)$ to $f_i(\bullet,C)$, capturing the network's evolution from a stable regime ($C \ll C_{crit}$) toward a different regime ($C > C_{crit}$) via a transition point ($C = C_{crit}$). The stability slowly decreases $f_i'(\bullet, C) \rightarrow 0$ as $C \rightarrow C_{crit}$.

Some networks may evolve by an internal feedback—such as the population adjusting their behavior based on the perceived system state. Introduced herein are the dynamics of the C affected by the state $$X: \frac{dC}{dt} = H(X),$$

where H(X) represents the degree of the network's global order. For instance, media reports of rapidly increasing asset price can further drive the consumers to the market; H(X) may represent the price increase reflecting the 'consumer herd' entering the market.

When the phase transition weakens the autonomous dynamics, the effect of peer influence dominates and a self-organized population behavior emerges. Far from the transition, the dynamics F(X,C) dominate over the relatively weaker interaction LX, exhibiting isolated motions. Approaching the transition, the returning force F'(X,C) becomes weaker than the persisting LX. The shifting balance from the dynamics to structure causes the motions to become highly correlated, resulting in global patterns. The well-known phenomenon of spontaneous symmetry breaking applies here, with more interesting consequences in the context of complex networks.

(4.2) Estimation of Instability and Network Connectivity

The estimation technique improves upon the prior art model (see Literature Reference Nos. 4, 6, 7, 8, and 9) to be applicable to a broad range of complex networks where each node revolves around a stable state and exchange influences with other nodes. The process is summarized as follows. First, it is required to identify the nodes and features to be measured from the complex network. Examples of nodes are cities for housing market and the EEG electrodes for the Brain data. Examples of features are Case-Schiller indices for housing data, search volumes for Google Trends data, and EEG measurements for the brain data. Next, the system receives data from each node over time, where the data represents the dynamics of the complex network. Thereafter, a fixed moving time window size is determined (e.g., 3 months for housing data and 1000 time points for EEG). The window size can be determined empirically so that the window size maximizes the difference between $\mu_1$ from normal periods and $\mu_1$ from unstable periods. Next, the covariance matrix is calculated for the time series inside the first time window. The eigenvalues are then calculated for the covariance matrix. The time window is thereafter moved by one time point to form second time window, with the covariance matrix and eigenvalues calculated for the time series in the second time window. It is then determined if the eigenvalues $\mu_1$ are above a predetermined threshold (such as approaching transition or near instability). Finally, a connectivity of the complex network can be determined based on the first and second covariance matrices. Each of these aspects are described in further detail below.

An animal or human is a good example of such a network with nodes. The combination of the evolving dynamics, the peer influence, and the random perturbation leads to a network of stochastic differential equations: dX=(F(X,C)−LX)dt+σdW. The network's total deterministic dynamics around the equilibrium $(x_1^{eq}, \ldots, x_N^{eq}) = X^{eq} = X^{eq}(C)$ can be linearly approximated by the Jacobian of F(X,C)−LX at $X^{eq}$, as follows:

$$F'(x^{eq}, C) - L = \begin{pmatrix} f_1'(x_1^{eq}, C) & \cdots & 0 \\ \vdots & \ddots & \vdots \\ 0 & \cdots & f_N'(x_N^{eq}, C) \end{pmatrix} - L \stackrel{def}{=} J_C \quad (1)$$

The degree of coordination is measured by the covariance matrix over some time window [t, t+Δt]: $Cov_C(t,X) = E_{t,t+\Delta t}[X-Mean(X)][X-Mean(X)]^T$ for a fixed C. A combination of the perturbation equation (see Literature Reference No. 13) and its covariance equation (see Literature Reference No. 14) and derives a closed-form solution of the $Cov_C$ in terms of the Jacobian and the Laplacian:

$$Cov_C(t, X) = \frac{\sigma^2}{2} J_C^{-1} (e^{2J_C \Delta t} - 1) e^{2J_C t} \quad (2)$$

It is assumed that the returning forces become more homogeneous near the transition $(k(C) \stackrel{def}{=} f_1'(x_1^{eq},C) \simeq \cdots \simeq f_N'(x_N^{eq},C) \rightarrow 0)$, so that the covariance eigenvalues $\mu_1, \mu_2, \ldots, \mu_N$ can be expressed using the k(C) and the Laplacian eigenvalues $\lambda_1 = 0, \lambda_2, \ldots, \lambda_N$, as follows:

$$\mu_i = \mu_i(C) = \frac{\sigma^2}{2(k(C) - \lambda_i)} (e^{2(k(C) - \lambda_i)\Delta t} - 1) e^{2(k(C) - \lambda_i) t} \quad (3)$$

The eigenvectors match the Laplacian eigenvectors. The leading eigenvalue $$\mu_1(C) = \frac{\sigma^2}{2k(C)} (e^{2k(C)\Delta t} - 1) e^{2k(C) t}$$

depends only on the k(C) (but not on $\lambda_2, \ldots, \lambda_N$); implying that it can serve as a structure-invariant indicator of the transition. The invariance is a consequence of the peer interaction LX not contributing to the synchronization manifold (see Literature Reference No. 13) $v_{sync} = (1, 1, \ldots 1)$, but has nontrivial property implications, such as:

1. The degree of the global order $\mu_1$ of the population indicates the network's instability due to a phase transition regardless of its connectivity.
2. When the evolution is driven by an internal feedback $$\frac{dC}{dt} = H(X),$$

the resulting changes to the instability does not depend on the scale N or the connectivity L.

So far it is assumed that the network Laplacian L (degrees of interactions) is constant. The network itself may be allowed to change with the same timescale of C (L is fixed within the time window [t, t+Δt]); all of the results hold under the relaxed assumption. Property 1 leads to a corollary that $\mu_1$ is invariant to the evolution of the network; when it adds or removes nodes or edges (with changing weights) during the transition, $\mu_1$ will still provide a structure-invariant measure of the phase C. This property is especially powerful because most real world networks go through constant changes in their topology. Property 2 holds that the 'global order' H(X) only contributes to the direction of $v_{sync}$. Property 2 has an interesting interpretation in the context of the influence of newsfeeds, that the 'destabilizing effect' of global news (e.g., about the current state of the stock market) does not depend on the social network.

On the other hand, the rest of the covariance eigenvalues reveals the structure of the network. From equation (3), the instability will amplify the Laplacian spectrum $\lambda_2, \ldots, \lambda_N$ as $k(C) \to 0$:

The network reveals its underlying structure through the amplified Laplacian modes at the transition, facilitating the estimation of the network connectivity. In fact, L can be recovered from the covariance matrices $\text{Cov}_C(t-\Delta t, X)$ and $\text{Cov}_C(t, X)$ computed over two successive time windows. Equation (3) derives:

$$\text{Cov}_C(t,X)\text{Cov}_C(t-\Delta t,X)^{-1} = e^{2JC\Delta t} = e^{2\Delta t F'(x^{eq},C)} e^{-2\Delta t L}, \quad (4)$$

where $F'(x^{eq}, C)$ is the only unknown factor. As can be seen from the expression in equation (1), the heterogeneity of $f_1, f_2, \ldots, f_N$ will distort the covariance eigenmodes. Near the transition, $F'(x^{eq}, C) \to 0$ so that the evolving connectivity L can be estimated using equation (4) more reliably independent of the particular F. That is, the distortion effect is zero at the transition—the dynamic network loses its individual property and its more genuine structure emerges.

(4.3) Example Applications
(4.3.1) Detection of Fold Bifurcation or Pitchfork Bifurcation and Structure Estimation of Complex Networks
The fold bifurcation $$F(X, C) = rX\left(1 - \frac{X}{K}\right) - C\frac{X^2}{X^2 + 1}$$

models the catastrophic changes of logistically changing population, with the shifting grazing rate C, the growth rate r, and the carrying capacity K. The pitchfork bifurcation $F(X, C) = CX - X^3$ models the transition from a single-well potential to a double-well potential (an emergence of alternative regimes). There are other forms of bifurcation, but the diversity is reduced near the $C = C_{crit}$ to exhibit the same qualitative behavior.

Figure 4:
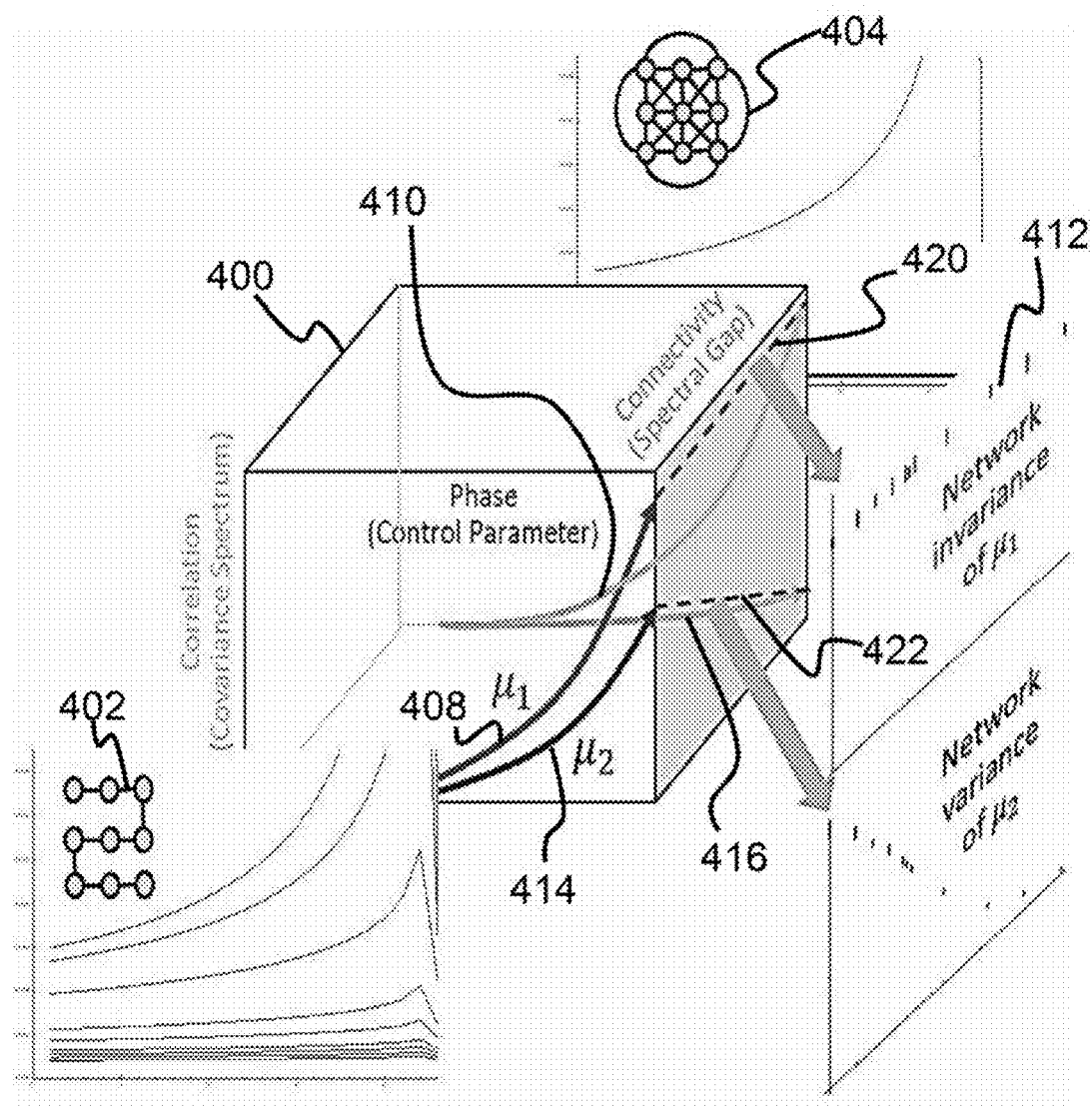
FIG. 4 is graph showing the growth of covariance spectra for a linearly connected 9-node network and a fully connected 9-node network, all going through pitchfork bifurcations.

FIG. 4, for example, is a graph 400 depicting the growth of covariance spectra for a sparse linearly connected 9-node network 402 and a dense fully connected 9-node network 404, all going through fold bifurcations. The $\mu_1(C)$ evolves identically for both networks, but the rest of the spectrum follows different curves as expected by the equation (3). The growth of covariance spectra from ten different networks having varied connectivity confirms the invariance property of the $\mu_1(C)$ and the variance property of the $\mu_2(C)$.

The first top plot 408 shows the growth of the covariance spectrum from a linearly connected network 402 as it evolves toward a fold bifurcation. The second top plot 410 shows the spectrum growth for a fully connected network 404 as it goes through the same evolution. Both $\mu_1$s (top curves 408 and 410) reveal identical growths (verifying the invariance 412), but the rest of the spectrum (first bottom curve 414 and second bottom curve 416) show vastly different growth profile. Note that higher order spectrum for the fully connected network 404 is collapsed into almost flat curves. The upper plot 420 shows uniform growths of $\mu_1$ computed over 10 networks having varied connectivity, verifying the invariance. The lower plot 422 shows the varied growths of $\mu_2$ computed for the same set of networks.

Figures 5A, 5B:
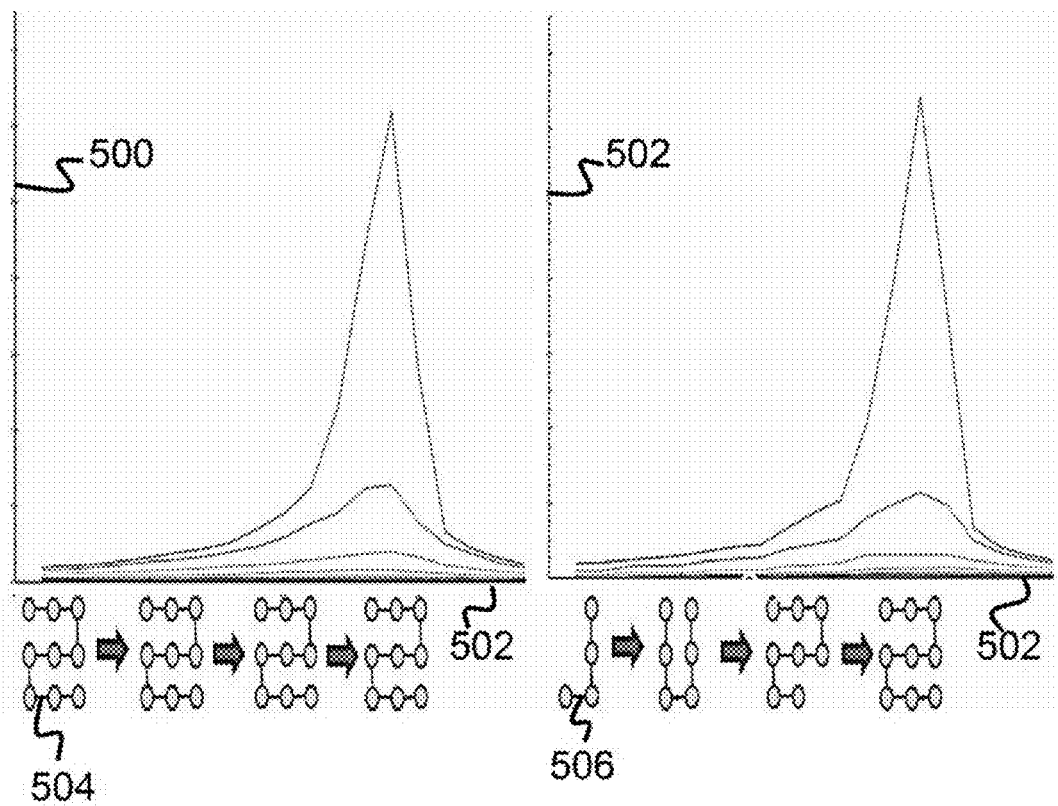
FIG. 5A is a graph depicting spectrum changes of a 9-node linear network as it goes through a pitchfork bifurcation.
FIG. 5B is a graph depicting the spectrum changes of a growing network, starting from a 4-node linear network to a 9-node linear network.

As supported by Property 1, the invariance of the leading eigenvalue holds while network nodes and edges are being added or removed. This is further verified by FIGS. 5A and 5B, which depict the invariance of $\mu_1$ for a growing network. The horizontal and vertical axes represent the time evolution 500 of the networks toward a pitchfork bifurcation and the changes in spectrum 502, respectively. The invariance of the leading eigenvalue $\mu_1$ as an indicator of phase transition holds while network nodes and edges are being added or removed. Specifically, FIG. 5A is a plot depicting the spectrum changes of a 9-node linear network 504 as it goes through a pitchfork bifurcation, provided as a reference. The linear structure is fixed during the network's evolution. The spectrum is ordered $\mu_1 > \ldots > \mu_9$ from the top curve. Alternatively, FIG. 5B is a plot depicting the spectrum changes of a growing network 506, starting from a 4-node linear network to a 9-node linear network. At each growth stage, the covariance matrix is constructed from the augmented nodes; the covariance matrix starts from a 4×4 matrix and grows to a 9×9 matrix. The leading eigenvalues from both plots show almost identical curves, confirming the invariance of $\mu_1$. Thus, it can be determined if $\mu_1$ is above a certain threshold empirically by a statistical analysis over training periods. The statistical analysis computes the distribution of $\mu_1$ over stable periods and the distribution of $\mu_1$ over unstable periods. A threshold can be set to maximize the probability of correct detection of instability based on the training periods.

Figure 6:
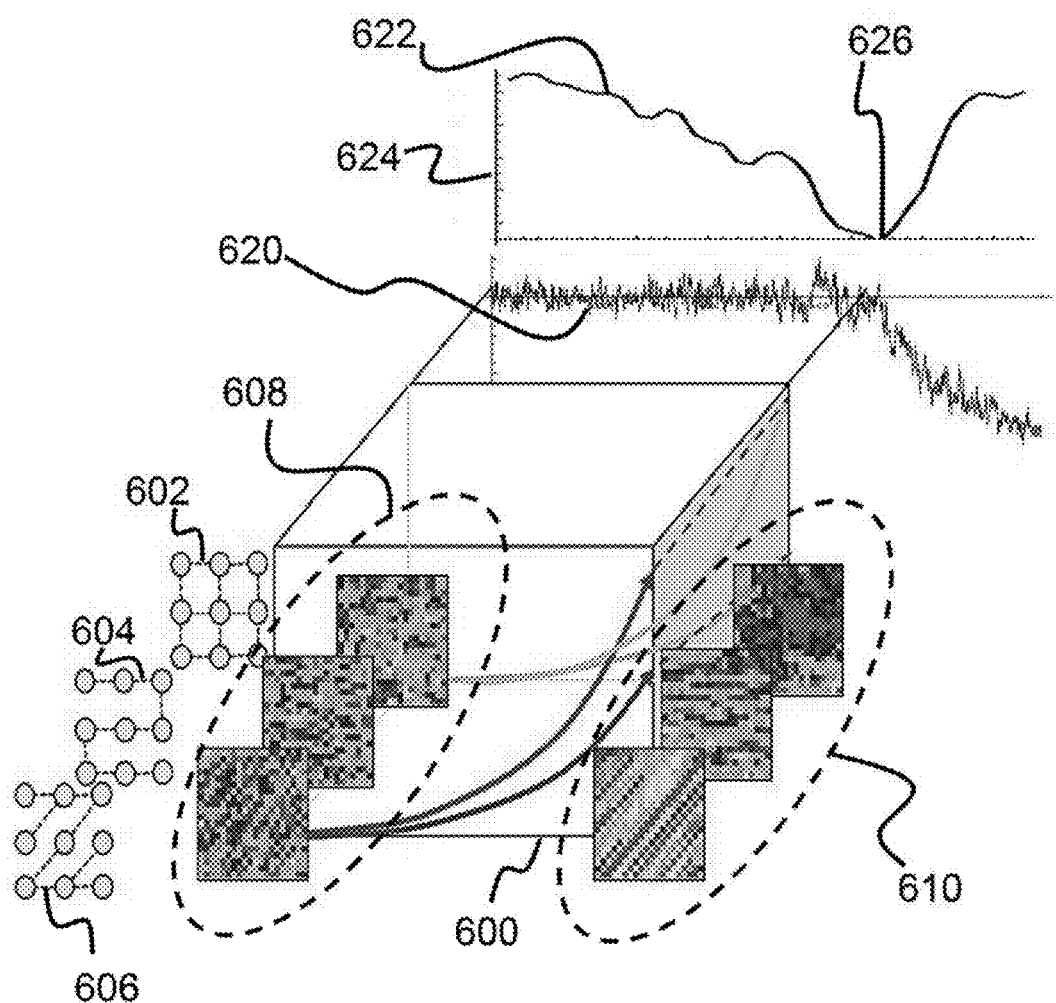
FIG. 6 is a chart illustrating the structure revealing property at phase transition.

The structure revealing property at phase transition is shown in FIG. 6. In this example, the horizontal axis 600 represents the time evolution of the network going through a pitchfork bifurcation. Three 20×20 networks having distinct geometric connections (i.e., grid 602, linear 604, and slanted 606) are depicted as going through the bifurcation. When each network is far from the bifurcation, the state of the 20×20=400 node network represented as pixel values 608 show only slight differences. However, when each network approaches the bifurcation point, the pattern 610 clearly reveals the underlying geometry.

Also depicted is the structure estimation at phase transition. The first plot 620 depicts 9-node linear network dynamics as being simulated to go through a pitchfork bifurcation, with Equation (4) estimating the Laplacian matrix from the state covariance matrices. The Y-axis of the first plot 620 represents the state of the dynamics while the X-axis represents time. The difference in terms of Frobenius norm between the estimated Laplacian matrix and the true Laplacian matrix is provided in the second plot 622. The Y-axis of the second plot 622 represents Frobenius norm between the estimated Laplacian matrix and the tru Laplacian matrix while the X-axis represents time. The difference 624 achieves a minimum at the bifurcation point 626, verifying the optimal structure recovery property at the phase transition.

(4.3.2) Housing and Commodity Market Forecasts
Human society is being modeled and studied as a complex system to identify trends or crises, further encouraged by the recent surge of publicly available data. For example, Literature Reference No. 15 describes the behavior of mimicry in trading decisions based on price fluctuations, while the researchers in Literature Reference No. 16 utilized information-gathering behavior of traders by monitoring Web search volumes. These behaviors fit the profile of the behavior model described herein; however, the prior art utilizes conventional scalar quantity (price index, search volume, etc.) as the measurement of the population behavior while the analysis according to the principles of the present invention interprets multiple measurements based on an underlying dynamic model to detect trends or crises.

Figure 7:
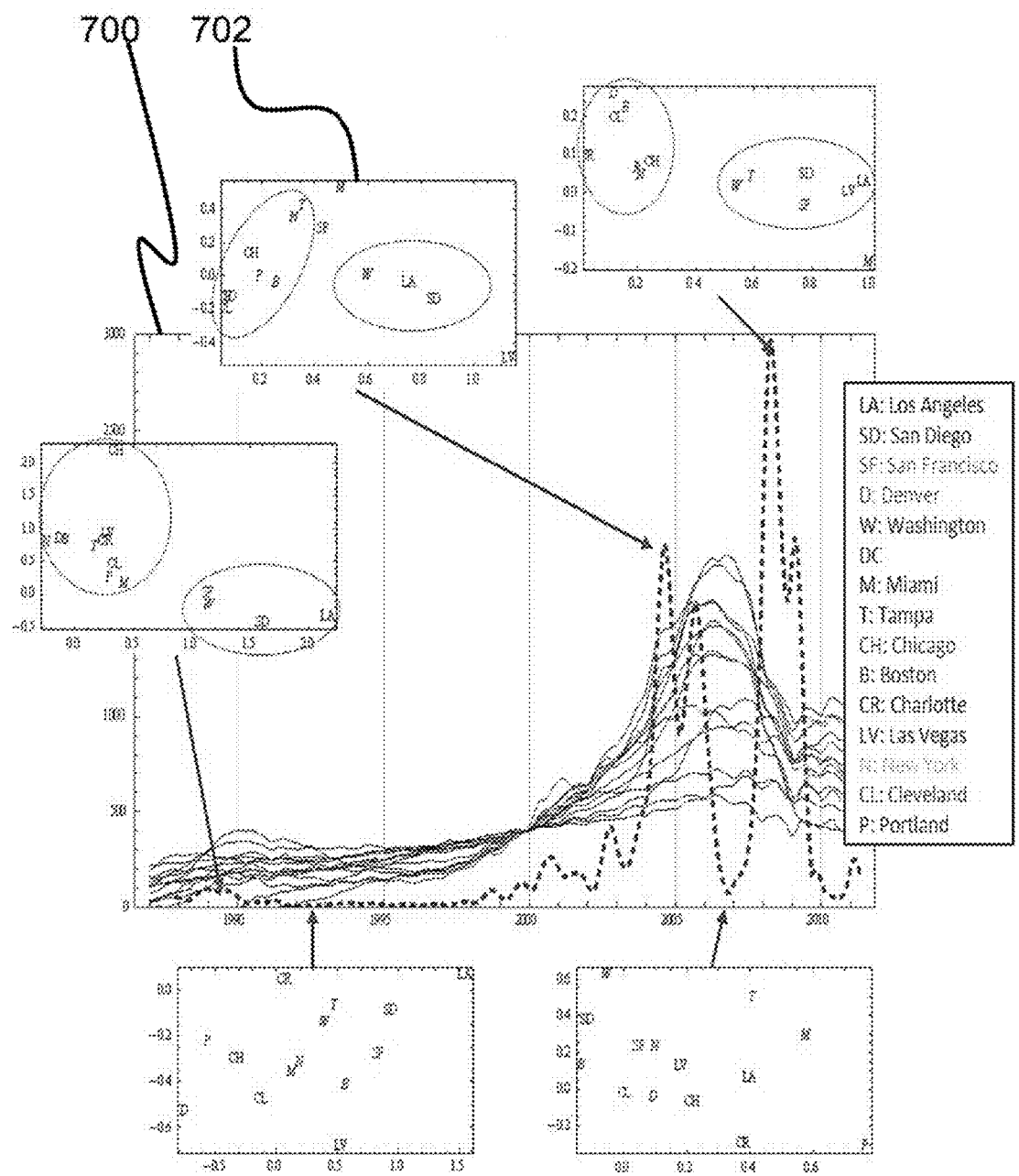
FIG. 7 is a chart depicting a covariance spectrum computed from Case-Schiller housing index time series for major U.S. cities.

The housing bubble is thought to have been caused by consumers' herd behavior. Their buying or selling decisions were largely made based on both personal circumstances and peer effects. The model of the present invention assumes that external influence (e.g., low mortgage rates) destabilize individuals to base their purchase decisions less on personal circumstances but more on the others' decisions. FIG. 7, for example, is a chart depicting the covariance spectrum 700, which measures the degree of instability and indicates the approaching crash of financial markets. FIG. 7 illustrates that the system according to the principles of the present invention correctly detects the housing market instability during the 2004-2009, and correctly estimates the underlying structure of the market. The Y-axis represents the computed instability for the red curve and the Case-Schiller indexes for the cities for the rest of the curves and the X-axis represents time or the relevant year.

Thus, the covariance spectrum 700 over changes in housing prices serves as a leading indicator of market instability. The rapid price increase and collapse coincide with a very high degree of instability, especially during the latest housing boom (2003-2006) and bust (2007-2009). Each inset 702 shows the projections of the 14 cities into two-dimensional eigenspace, which reveal meaningful geo-economic clusters.

Figure 8:
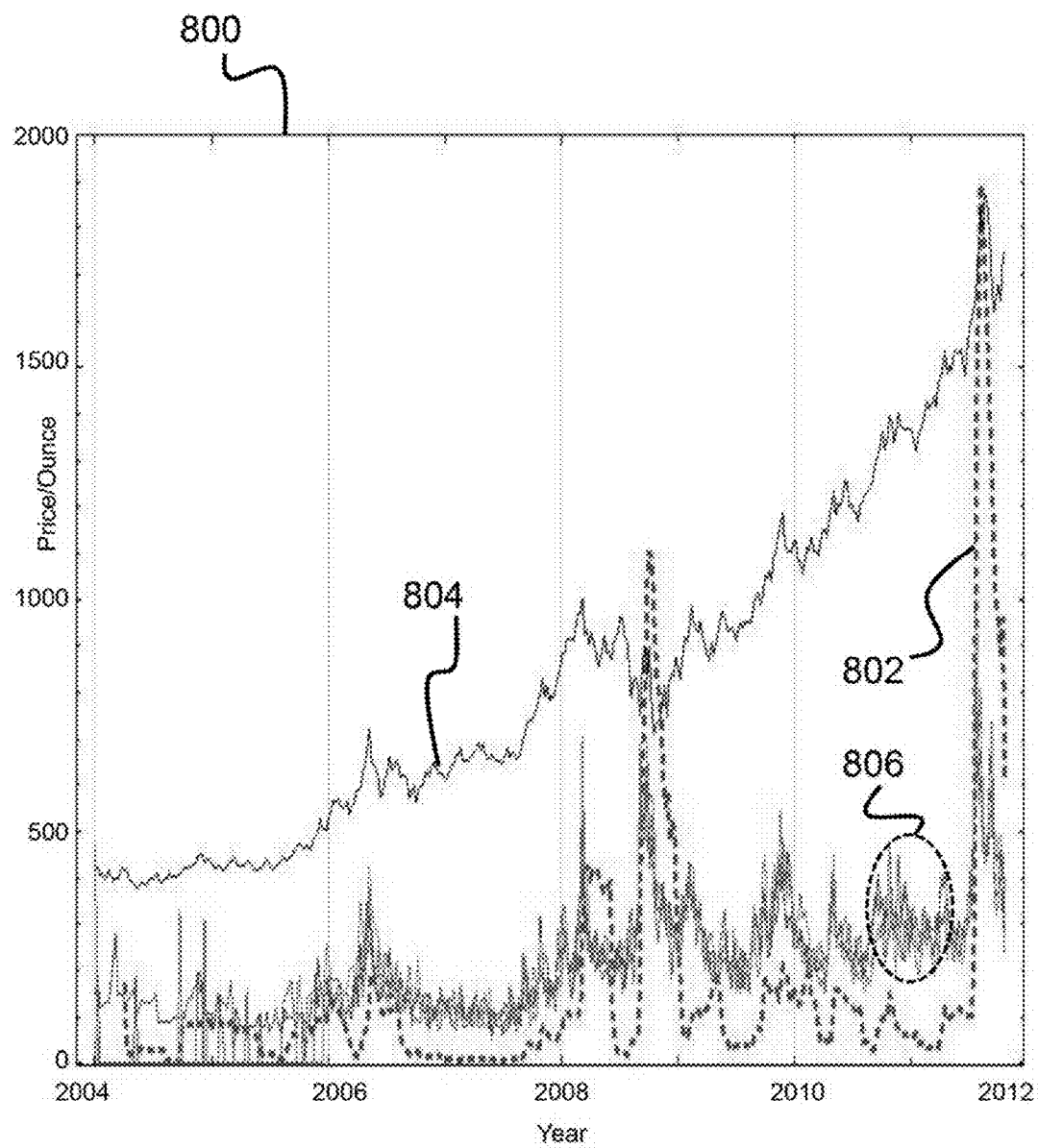
FIG. 8 is a chart depicting the changes in the leading covariance eigenvalues of the Google search volumes of the keyword 'gold price' from five U.S. major metropolitan areas plotted against the actual gold price fluctuations.

The commodity market is also a good example of systems affected by herd behavior. FIG. 8, for example, is a chart 800 depicting the changes in the leading covariance eigenvalues 802 of the Google search volumes 806 of the keyword 'gold price' from five U.S. major metropolitan areas plotted against the actual gold price fluctuations 804. The Y-axis represents the computed instability for the red curve and the Google search volumes the rest of the curves, while the X-axis represents time or the applicable year. The distinct peaks of the leading eigenvalue match the period of severe price fluctuations, including the global financial crisis during 2008 and the recent Euro crisis in 2011.

(4.3.3) Detection of Epileptic Seizures of Human Brain

Figure 9:
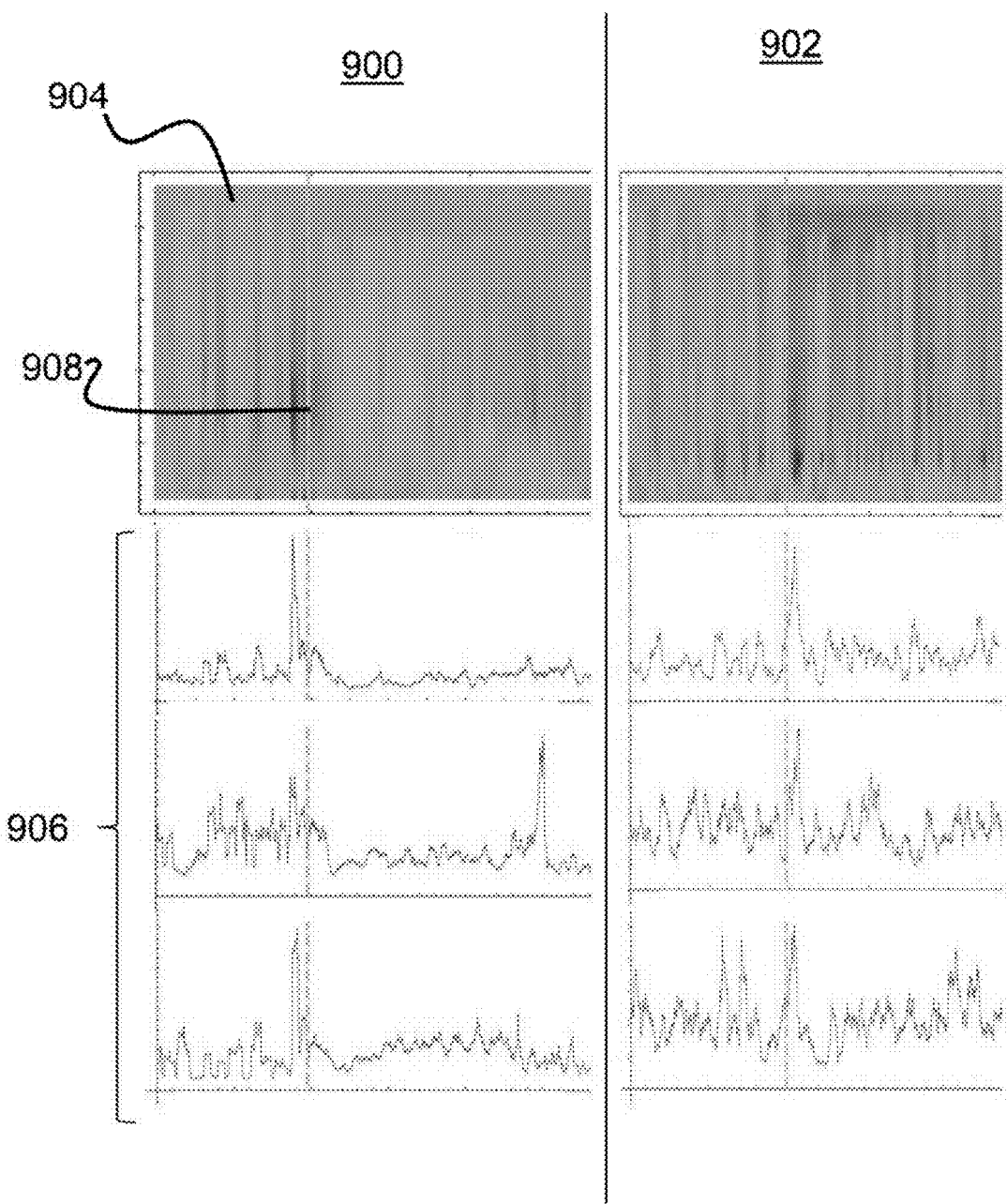
FIG. 9 depicts surface EEG signals around the seizure activities from 23-channel surface EEG recordings of two patients.

Brain activities measured by electroencephalogram (EEG) are thought to be governed by nonlinear dynamics. It has been found that EEG signals frequently show characteristic increase of variance (see Literature Reference No. 19) and reduction of dimensionality (see Literature Reference No. 20) right before the onset of seizures. For example, researchers in Literature Reference No. 4 discussed the seizure as a potential case of critical slowing down due to the phase transition to hypersynchronous neuronal activities. Other researchers (see Literature Reference No. 21) analyzed the intracranial EEG signals by comparing eigenvalues of signal correlation matrices, and found characteristic shifts toward large-scale correlations at the onset and termination of seizure activities. Based on the above, it is assumed that the EEG signals can be used as a good case of self-organized brain activities indicating a phase transition. FIG. 9, for example, includes a series of graphs, with each column showing the changes of the spectrum and the ratio $(\mu_1 + w_2\mu_2)/(w_3\mu_3 + \ldots + w_9\mu_9)$ for a patient. Specifically, FIG. 9 depicts surface EEG signals around the seizure activities from 23-channel surface EEG recordings of two patients, Patient A 900 (left column) and Patient B 902 (right column). Three seizure recordings for each patient were analyzed to generate one spectrum density plot 904 each and three plots 906 of the ratio between large scale and lower scale eigenvalues. The spectrum density plot 904 clearly exhibits the shift to large-scale correlations at the onset of epileptic seizures (the dotted orange line 908). The horizontal axis represents the time, and the vertical axis represents the eigen space index from 1 to 23. Hot (red) colors mean higher eigenvalue. Note that the Patient A 900 exhibits earlier scale shifts and Patient B 902 exhibits peaks slightly after the onset. In the bottom three plots 906, the ratio $(\mu_1 + w_2\mu_2)/(w_3\mu_3 + \ldots + w_9\mu_9)$ between the leading eigenvalue and the sum of lower eigenvalues captures the surge of large-scale correlation at the onset of epileptic seizures. $w_i = 2^t$ are normalizing scale factors. The top plots correspond to the spectrum density plots 904 above. The results suggest that the brain activities go through a general kind of phase transition at the start of the seizure.

As noted above, systems can be being modeled and studied to identify and predict instability and state transitions. It should be noted that although housing and EEG signals are explicitly described, they are used as non-limiting examples of suitable applications. Thus, it should be understood that the present invention can be applied to any complex network and that the examples used are for illustrative purposes only.

What is claimed is:

1. A system for instability detection and structure estimation of a complex network, the system comprising:
   one or more processors and a memory, the memory being a non-transitory computer-readable medium having executable instructions encoded thereon, such that upon execution of the instructions, the one or more processors perform operations of:
   identifying nodes and features to be measured from the complex network;
   receiving data from each node over a time series, the data representing, dynamics of the complex network;
   determining a first time window, the time window having a fixed window size;
   calculating a covariance matrix for a time series inside the first time window;
   calculating eigenvalues $\mu_i$, for the covariance matrix;
   moving the time window by one time to form a second time window;
   calculating a second covariance matrix for a time series inside the second time window;
   calculating eigenvalues for the second covariance matrix; and
   determining stability of the complex network.

2. The system as set forth in claim 1, further comprising an operation of calculating underlying connectivity of complex network based on the first and second covariance matrices.

3. The system as set forth in claim 2, wherein in calculating underlying connectivity of complex network, the connectivity can be calculated using an amplified Laplacian.

4. The system as set forth in claim 3, wherein in determining a first time window having a fixed window size, the window size is determined so that the window size maximizes a difference between $\mu_i$ from, stable periods and $\mu_i$ from unstable periods.

5. The system as set forth in claim 4, wherein determining stability of the complex network further comprises an operation of determining if the eigenvalues $\mu_i$ are above a predetermined threshold.

6. The system as set forth in claim 1, wherein in determining a first time window, having a fixed window size, the window size is determined so that the window size maximizes a difference between $\mu_i$ from stable periods and $\mu_i$ from unstable periods.

7. The system as set forth in claim 1, wherein determining stability of the complex network further comprises an operation of determining if the eigenvalues $\mu_i$ are above a predetermined threshold.

8. A computer program product for instability detection and structure estimation of a complex network the computer program product comprising:
a non-transitory computer-readable medium having executable instructions encoded thereon, such that upon execution of the instructions by one or more processors, the one or more processors perform, operations of:
identifying nodes and features to be measured from the complex network;
receiving data from each node over a time series, the data representing dynamics of the complex network;
determining a first time window, the time window having a fixed window size;
calculating a covariance matrix for a time series inside the first time window;
calculating eigenvalues $\mu_i$, for the covariance matrix;
moving the time window by one time point to form a second time window;
calculating a second covariance matrix for a time series inside the second time window;
calculating eigenvalues for the second covariance matrix; and
determining stability of the complex network.

9. The computer program product as set forth in claim 8, further comprising an operation of calculating underlying connectivity of complex network based on the first and second covariance matrices.

10. The computer program product as set forth in claim 9, wherein in calculating underlying connectivity of complex network, the connectivity can be calculated using an amplified Laplacian.

11. The computer program product as set forth in claim 10, wherein in determining a first time window having a fixed window size, the window size is determined so that the window size maximizes a difference between $\mu_i$ from stable periods and $\mu_i$ from unstable periods.

12. The computer program product as set forth in claim 11, wherein determining stability of the complex network further comprises an operation of determining if the eigenvalues $\mu_i$ are above a predetermined threshold.

13. The computer program product as set forth in claim 8, wherein in determining a first time window having a fixed window size, the window size is determined so that the window size maximizes a difference between $\mu_i$ from stable periods and $\mu_i$ from unstable periods.

14. The computer program product as set forth in claim 8, wherein determining stability of the complex network further comprises an operation of determining if the eigenvalues $\mu_i$ are above a predetermined threshold.

15. A computer implemented method for instability detection and structure estimation of a complex network, the method comprising an act of:
causing one or more processors to execute instructions encoded on a non-transitory computer-readable medium, such that upon execution, the one or more processors perform operations of:
identifying nodes and features to be measured from the complex network;
receiving data from each node over a time series, the data representing dynamics of the complex network;
determining a first time window, the time window having a fixed window size;
calculating a covariance matrix for a time series inside the first time window;
calculating eigenvalues $\mu_i$, for the covariance matrix;
moving the time window by one time, point to form a second time window;
calculating a second covariance matrix for a time series inside the second time window;
calculating eigenvalues for the second covariance matrix; and
determining stability of the complex network.

16. The computer program product as set forth in claim 15, further comprising an operation of calculating underlying connectivity of complex network based on the first and second covariance matrices.

17. The computer program product as set forth in claim 16, wherein in calculating underlying connectivity of complex network, the connectivity can be calculated using an amplified Laplacian.

18. The computer program product as set forth in claim 17, wherein, in determining a first time window having a fixed window size, the window size is determined so that the window size maximizes a difference between $\mu_i$ from stable periods and $\mu_i$ from unstable periods.

19. The computer program product as set forth in claim 18, wherein determining stability of the complex network further comprises an operation of determining if the eigenvalues $\mu_i$ are above a predetermined threshold.

20. The computer program product as set forth in claim 15, wherein in determining a first time window having a fixed window size the window size is determined so that the window size maximizes a difference between $\mu_i$ from stable periods and $\mu_i$ from unstable periods.

* * * * *